United States Patent
Azarian Yazdi et al.

(10) Patent No.: US 10,485,023 B2
(45) Date of Patent: Nov. 19, 2019

(54) PAYLOAD-LESS PHYSICAL UPLINK MEASUREMENT INDICATION CHANNEL (PUMICH) DESIGN FOR UPLINK BASED MOBILITY

(71) Applicant: QUALCOMM Incorporated, San Diego, CA (US)

(72) Inventors: Kambiz Azarian Yazdi, San Diego, CA (US); Haitong Sun, Sunnyvale, CA (US); Tingfang Ji, San Diego, CA (US); Wanshi Chen, San Diego, CA (US); Hao Xu, Beijing (CN); Heechoon Lee, San Diego, CA (US); Hung Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/707,442

(22) Filed: Sep. 18, 2017

(65) Prior Publication Data
US 2018/0132275 A1 May 10, 2018

Related U.S. Application Data

(60) Provisional application No. 62/418,095, filed on Nov. 4, 2016.

(51) Int. Cl.
*H04W 74/00* (2009.01)
*H04W 72/12* (2009.01)
*H04W 74/08* (2009.01)

(52) U.S. Cl.
CPC ..... *H04W 74/004* (2013.01); *H04W 72/1284* (2013.01); *H04W 74/002* (2013.01);
(Continued)

(58) Field of Classification Search
CPC ... H04N 19/117; H04L 5/0091; H04W 74/002
(Continued)

(56) References Cited

U.S. PATENT DOCUMENTS

| 2004/0132416 A1* | 7/2004 | Yee ........................ H04L 1/0618 455/82 |
| 2010/0069084 A1 | 3/2010 | Parkvall et al. |

(Continued)

FOREIGN PATENT DOCUMENTS

EP    2015599 A1    1/2009

OTHER PUBLICATIONS

International Search Report and Written Opinion—PCT/US2017/052265—ISA/EPO—dated May 14, 2018.
(Continued)

*Primary Examiner* — Kiet M Doan
(74) *Attorney, Agent, or Firm* — Patterson & Sheridan, L.L.P.

(57) ABSTRACT

Certain aspects of the present disclosure provide techniques for payload-less physical uplink measurement indication channel (PUMICH) design for uplink based mobility. According to certain aspects, a method of wireless communication by a base station (BS) is provided. The method generally includes selecting a first set of random access procedure (RACH) sequences from a second set of RACH sequences, wherein the second set of RACH sequences comprises a pruned set of RACH sequences, and wherein at least some of the first set of RACH sequences selected for a first user equipment (UE) is also available for selection for a second UE, and transmitting the selected first set of RACH sequences to a UE in response to a request from the UE.

21 Claims, 10 Drawing Sheets

(52) U.S. Cl.
CPC ....... *H04W 74/08* (2013.01); *H04W 74/0833* (2013.01); *H04W 72/1226* (2013.01); *H04W 74/006* (2013.01); *H04W 74/0866* (2013.01)

(58) Field of Classification Search
USPC ..... 455/522, 422.1, 453, 436; 370/328, 330, 370/329, 312, 260, 280, 252, 350, 479, 370/285; 375/152, 130, 285
See application file for complete search history.

(56) References Cited

U.S. PATENT DOCUMENTS

| | | | |
|---|---|---|---|
| 2011/0051609 A1* | 3/2011 | Ishii | H04B 1/707 370/252 |
| 2011/0096748 A1 | 4/2011 | Meyer et al. | |
| 2011/0222498 A1* | 9/2011 | Chun | H04L 1/1877 370/329 |
| 2014/0341163 A1* | 11/2014 | Zhang | H04W 74/0833 370/329 |
| 2016/0366704 A1* | 12/2016 | Lee | H04W 72/0413 |

OTHER PUBLICATIONS

Partial International Search Report—PCT/US2017/052265—ISA/EPO—dated Feb. 13, 2018.
QUALCOMM Incorporated: "NR Uplink Measurement based Mobility in the Inactive State", 3GPP Draft; R2-167066, 3rd Generation Partnership Project (3GPP), Mobile Competence Centre; 650, Route Des Lucioles; F-06921 Sophia-Anti Polis Cedex; France, vol. RAN WG2, No. Kaohsiung, Taiwan; Oct. 1, 2016, XP051162407, Retrieved from the Internet: URL:http://www.3gpp.org/ftp/tsg_ran/WG2_RL2/TSGR2_95bis/Docs/ [retrieved on Oct. 1, 2016], 5 pages.
QUALCOMM Incorporated: "UL based Mobility PUMICH Scalability Analysis", 3GPP Draft; R1-1612038, 3rd Generation Partnership Project (3GPP), Mobile Competence Centre; 650, Route Des Lucioles; F-06921 Sophia-Anti Polis Cedex; France, vol. RAN WG1, No. Reno, USA; Nov. 5, 2016, XP051190271, Retrieved from the Internet: URL:http://www.3gpp.org/ftp/tsg_ran/WG1_RL1/TSGR1_87/Docs/ [retrieved on Nov. 5, 2016], 4 pages.

* cited by examiner

PAYLOAD-LESS PHYSICAL UPLINK MEASUREMENT INDICATION CHANNEL (PUMICH) DESIGN FOR UPLINK BASED MOBILITY

CLAIM OF PRIORITY UNDER 35 U.S.C. § 119

The present Application for patent claims benefit of U.S. Provisional Patent Application Ser. No. 62/418,095, filed Nov. 4, 2016, assigned to the assignee hereof and hereby expressly incorporated by reference herein.

BACKGROUND

Field of the Disclosure

Aspects of the present disclosure relate generally to wireless communications systems, and more particularly, to payload-less physical uplink measurement indication channel (PUMICH) design for uplink based mobility in a wireless network.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. These improvements may be applicable to other multi-access technologies and the telecommunication standards that employ these technologies. One such improvement may be a payload-less PUMICH design for uplink based mobility in a wireless network.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for uplink mobility using a payload-less PUMICH design for uplink-based mobility.

Certain aspects of the present disclosure provide a method for wireless communication that may be performed, for example, by a base station (BS). The method generally includes selecting a first set of random access procedure (RACH) sequences from a second set of RACH sequences, wherein the second set of RACH sequences comprises a pruned set of RACH sequences, and assigning the selected first set of RACH sequences to one or more UEs in a zone covered by the base station.

Certain aspects of the present disclosure provide another method for wireless communication that may be performed, for example, by a user equipment (UE). The method generally includes receiving a first set of random access procedure (RACH) sequences from a base station, and transmitting the first set of RACH sequences to the base station without a corresponding data payload identifying the UE.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
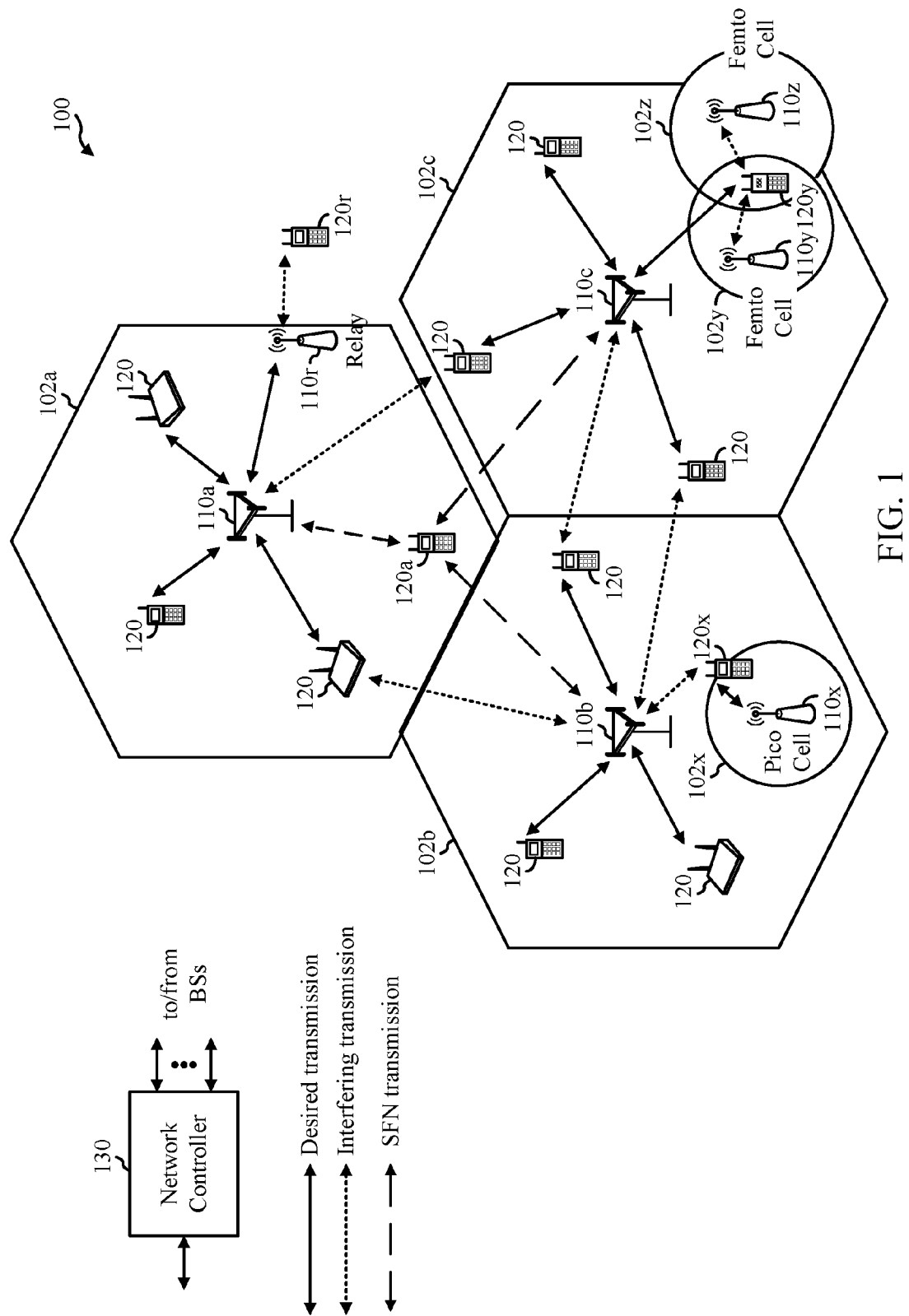
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology). NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements.

In downlink-based mobility such as in LTE, the network (e.g., base station (BS)) sends a reference signals (RS) (e.g., a measurement reference signal (MRS)) and the UE performs cells search based on the RSs. In such scenarios, the UE may frequently wake up to perform cell searches and taking a significant amount of power. In uplink-based mobility, the UE sends uplink reference signals (e.g., URS, chirps, PUMICH) and the network performs cell search based on the URSs. Uplink based mobility may improve UE battery life if the power used to send the URS takes comparatively less power as compared to cell searches, or reduces the frequency of UE wake ups.

In the downlink-based mobility, the UE may monitor for paging messages sent from the selected cell during paging occasions. Because the network may be aware of a tracking area (TA) to which the UE is registered, but not aware of the selected cell, paging may be paged by all of the cells in the TA; however, each cell transmits its paging channel independently of the other cells. Thus, the paging messages may interfere with one another. In the uplink-based mobility, the UE may monitor for a keep alive (KA) signal after sending the URS. The KA signal may indicate paging for the UE. In some cases, the best cell may not be selected. In this case, the KA signal and/or paging may be missed.

Aspects of the present disclosure provide techniques and apparatus for uplink based mobility using a payload-less PUMICH design.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio (NR) or 5G network. For example, UE 120a may receive single frequency network (SFN) transmissions from the base stations (BSs) 110a, 110b, and 110c. The SFN transmissions may be identical paging messages and/or keep alive (KA) signals that are transmitted simultaneously on a same frequency. The BSs 110a, 110b, and 110c may be transmission reception points (TRPs), Node Bs (NBs), 5G NBs, access points (APs), new radio (NR) BSs, gNBs, etc.). The BSs 110a, 110b, and 110c may be in same tracking area (TA) or zone.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, a macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS. A coarsely dashed line with double arrows indicates single frequency network (SFN) transmissions.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G NB, NB, TRP, AP) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
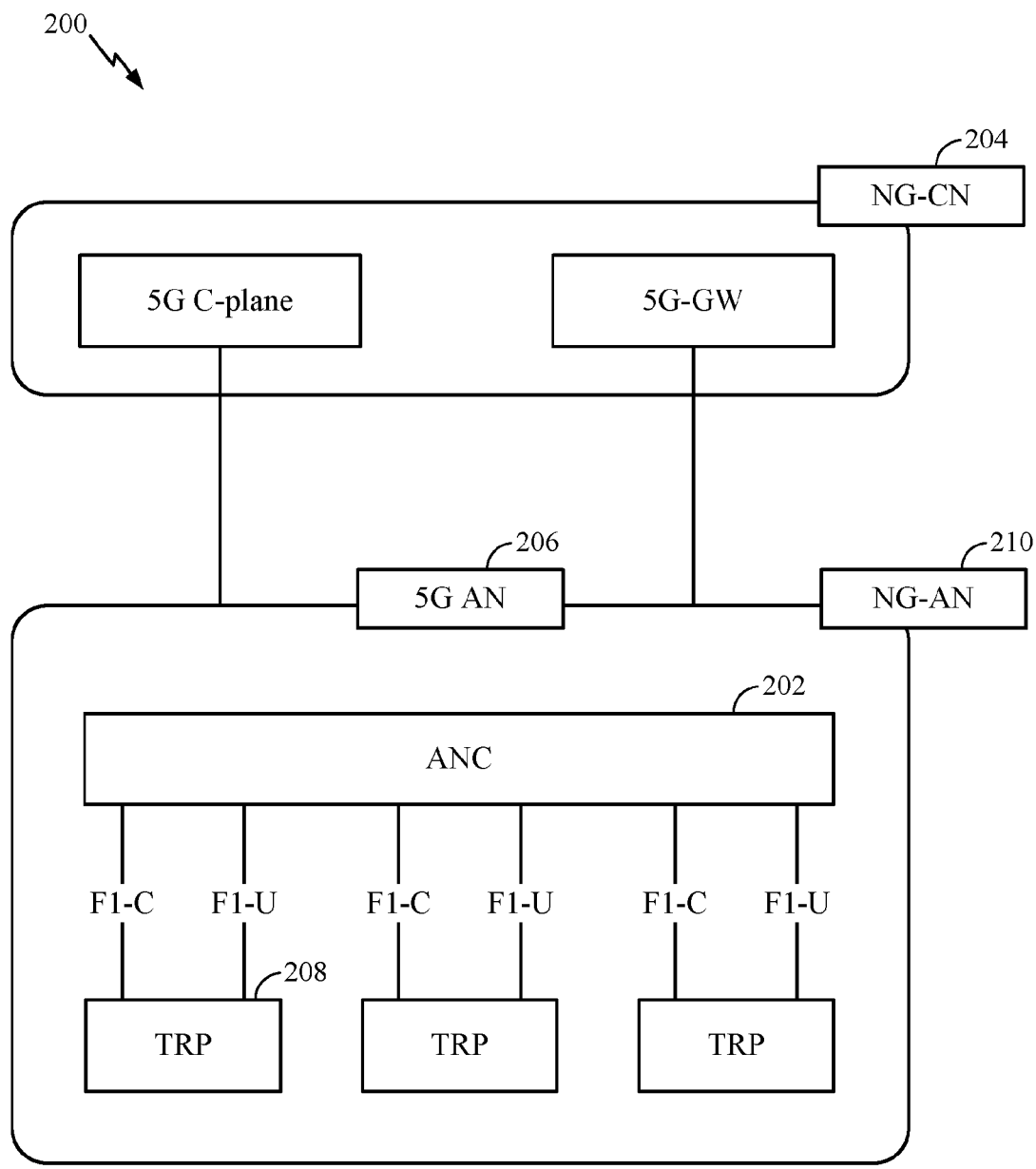
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE. According to certain aspects, the TRPs 208 may send identical signals simultaneously on a same frequency, such as paging messages and/or keep alive signals, as single frequency network (SFN) transmissions to a UE. The TRPs 208 may be in a same tracking area (TA) or zone.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
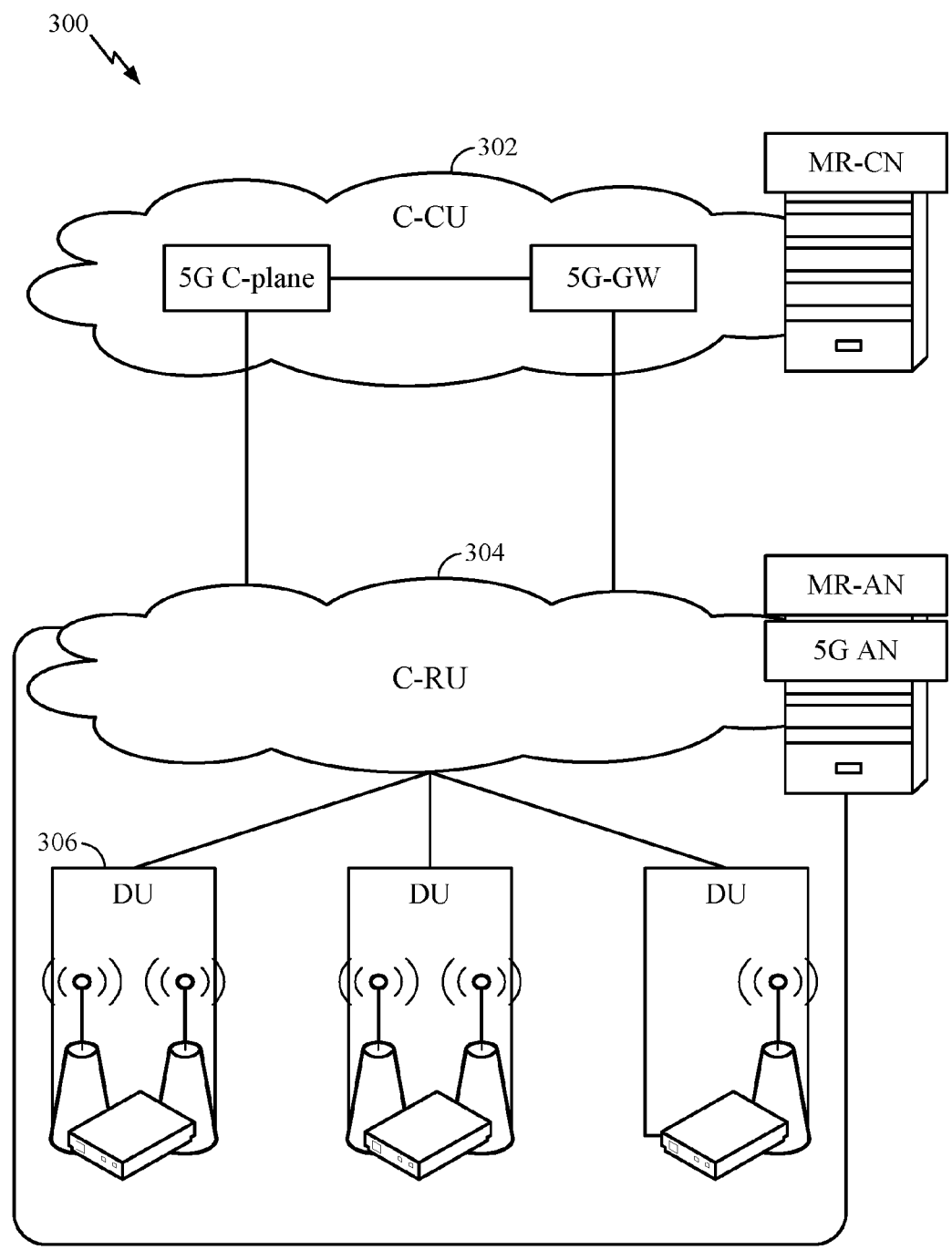
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
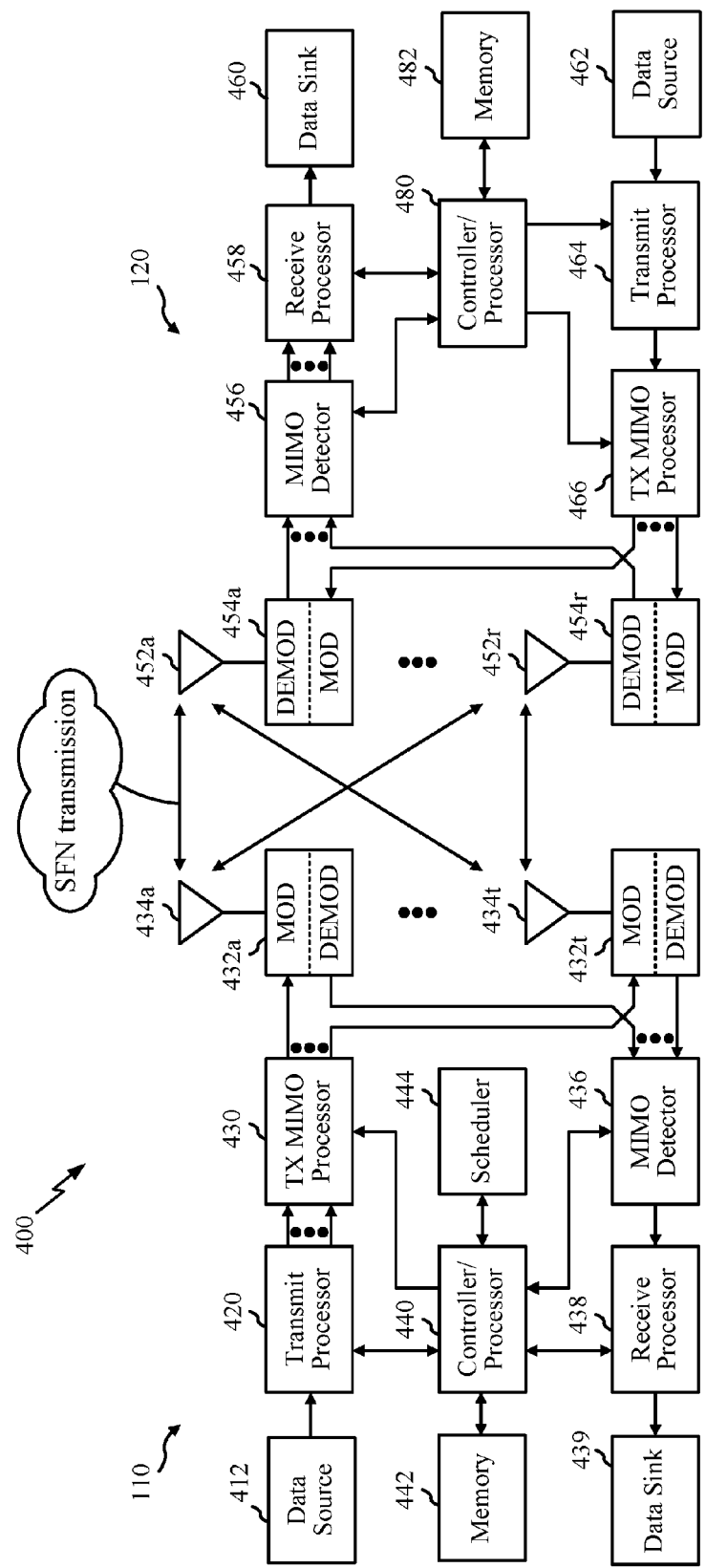
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 11-14. According to certain aspects, the BS 110 may send a transmission to the UE 120 as single frequency network (SFN).

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of various processes for the techniques described herein. The processor 480 and/or other processors and modules at the UE 120 may also perform or direct, e.g., the execution of the functional blocks illustrated in FIGS. 11 and 13, and/or other processes for the techniques described herein. The processor 440 and/or other processors and modules at the BS 110 may also perform or direct, e.g., the execution of the functional blocks illustrated in FIGS. 12 and 14, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
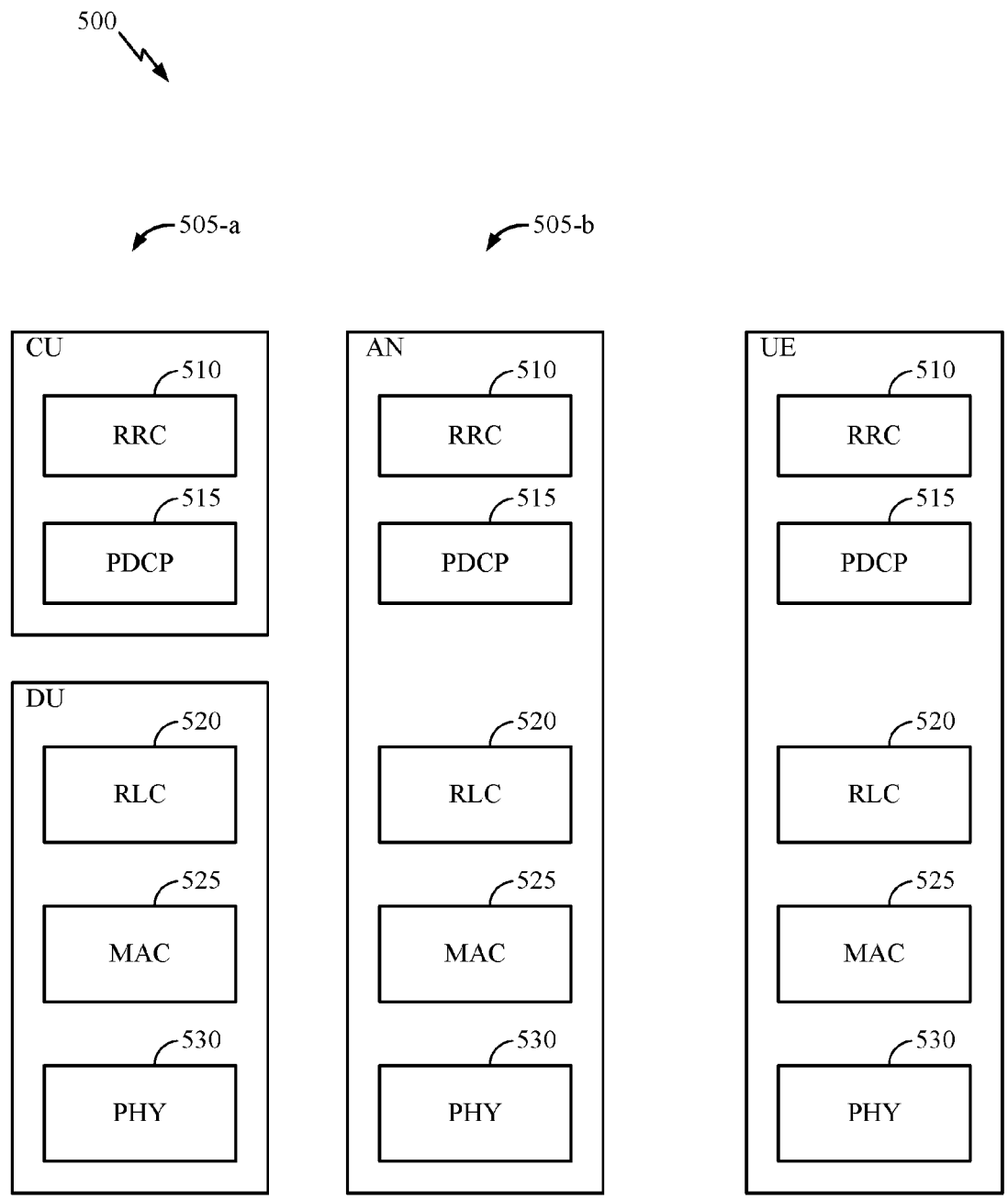
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
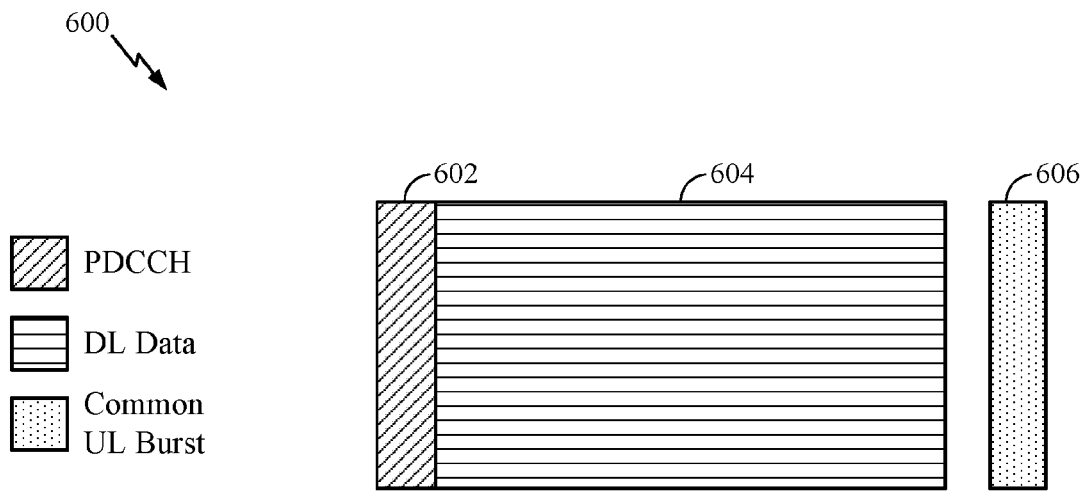
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
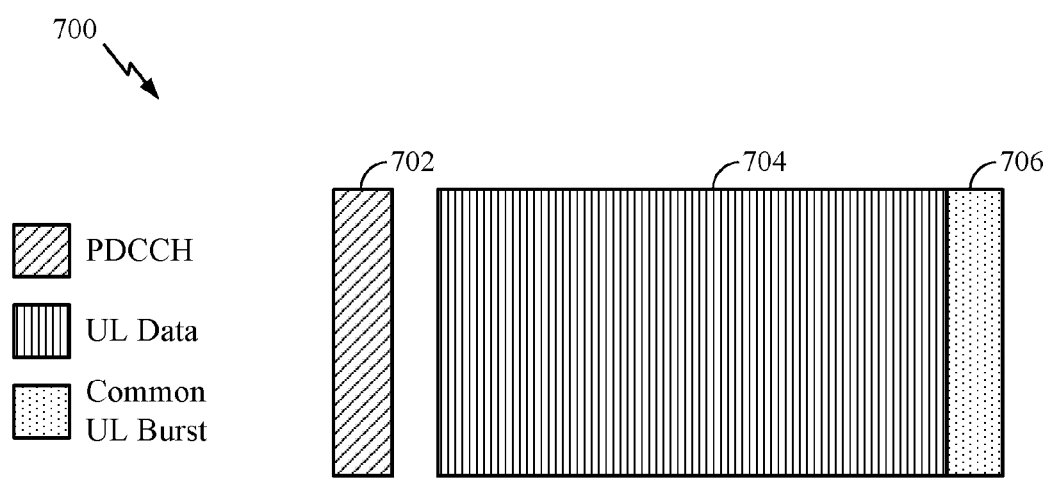
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical UL control channel (PUCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet-of-Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Figure 8:
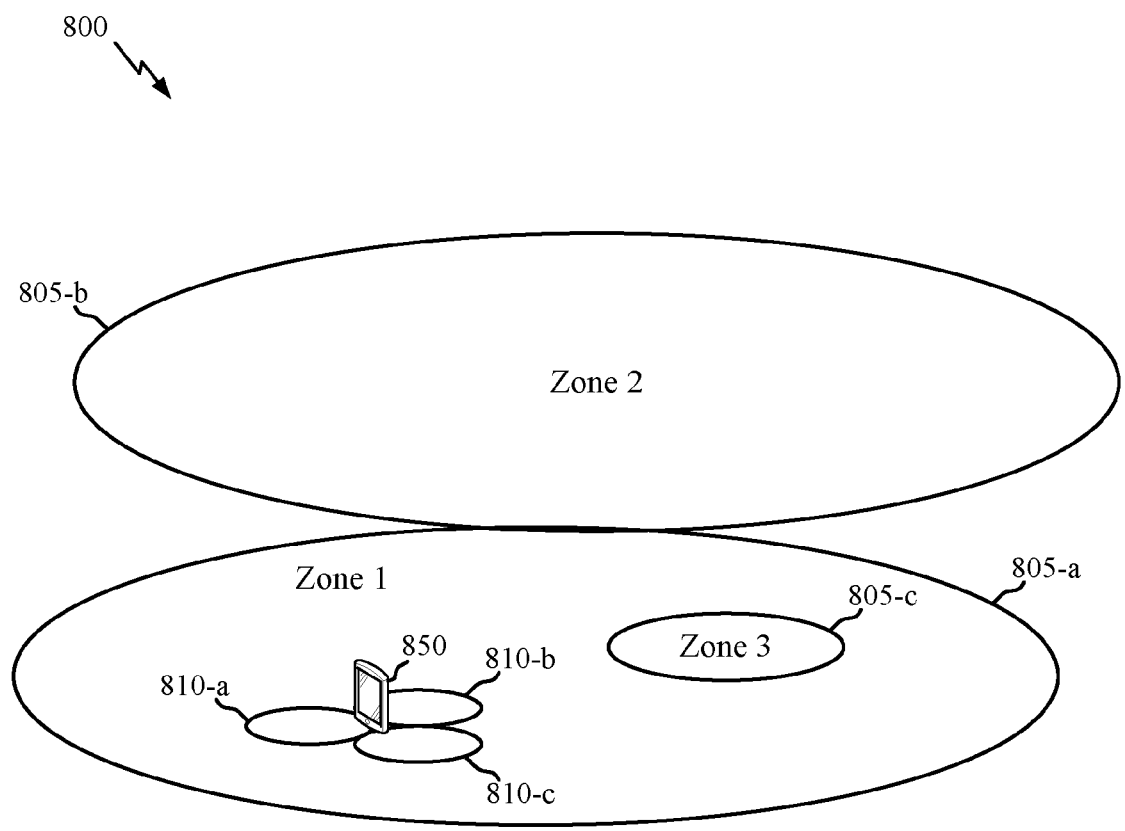
FIG. 8 illustrates an example of a wireless communication system supporting zones, in accordance with certain aspects of the present disclosure.

FIG. 8 illustrates an example of a wireless communication system 800 supporting a number of zones, in accordance with aspects of the present disclosure. The wireless communication system 800 may include a number of zones (including, e.g., a first zone 805-a (Zone 1), a second zone 805-b (Zone 2), and a third zone 805-c (Zone 3)). A number of UEs may move within or between the zones.

A zone may include multiple cells, and the cells within a zone may be synchronized (e.g., the cells may share the same timing). Wireless communication system 800 may include examples of both non-overlapping zones (e.g., the first zone 805-a and the second zone 805-b) and overlapping zones (e.g., the first zone 805-a and the third zone 805-c). In some examples, the first zone 805-a and the second zone 805-b may each include one or more macro cells, micro cells, or pico cells, and the third zone 1105-c may include one or more femto cells.

By way of example, the UE 850 is shown to be located in the first zone 805-a. If the UE 850 is operating with a radio resource configuration associated with transmitting pilot signals using a common set of resources, such as an RRC common state, the UE 850 may transmit a pilot signal using a common set of resources. Cells (e.g., ANs, DUs, etc.) within the first zone 805-a may monitor the common set of resources for a pilot signal from the UE 850. If the UE 850 is operating with a radio resource configuration associated with transmitting pilot signals using a dedicated set of resource, such as an RRC dedicated state, the UE 850 may transmit a pilot signal using a dedicated set of resources. Cells of a monitoring set of cells established for the UE 850 within the first zone 805-a (e.g., a first cell 810-a, a second cell 810-b, and a third cell 810-c) may monitor the dedicated set of resources for the pilot signal of the UE 850, tracking the mobility of UE 850. According to certain aspects, intra-zone mobility between cells of the zone may be transparent to the UE 850. For example, the cells in a zone, such as cells 810-a, 810-b, and 810-c, may cooperatively send identical signals, such as a physical KA channel (PKACH), to the UE 850. This PKACH may be used for acknowledging an UL mobility reference signal and signaling a paging indicator to the UE 850.

Figure 9:
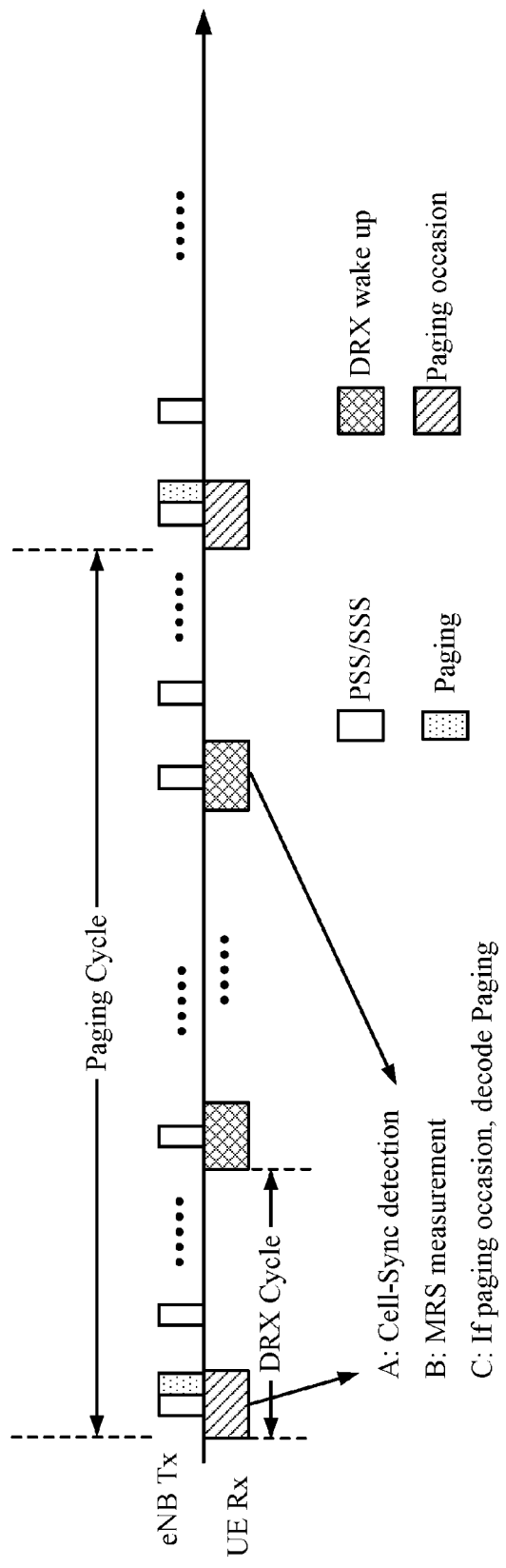
FIG. 9 is a transmission time illustrating an example downlink-based mobility scenario, in accordance with certain aspects of the present disclosure.

Example Uplink and Downlink Based Mobility Using Single Frequency Network (SFN) Paging and/or Keep Alive Signals FIG. 9 is a transmission time illustrating an example downlink-based mobility scenario for a user equipment (UE) (e.g., similar to UE 120) in discontinuous reception (DRX) operation, in accordance with certain aspects of the present disclosure. As shown in FIG. 9, in downlink-based mobility, the UE may wake up during a paging occasion (PO). The UE may synchronize to the network (e.g., a base station (BS) 110). For example, the UE may receive a primary synchronization signal (PSS), a secondary synchronization signal (SSS), and/or a measurement reference signal (MRS) from a BS to synchronize.

The UE may perform a cell search. For example, the UE may receive reference signals (e.g., MRS) from the serving cell and/or one or more serving cells. If a neighbor cell becomes better than the serving cell (or an offset amount better), the UE may select the neighbor cell as the serving cell. If the UE selects a cell outside the current tracking area (TA), then the UE will register with the new TA.

As shown in FIG. 9, if the DRX wakeup coincides with a paging occasion, the UE may decode the paging. Because the network is only aware of idle-mode UEs at the TA level, the UE is paged via all cells belonging to the TA in which the UE is registered; however, each cell transmits its paging channel independently of the other cells. As a result, the paging channel signal to interference noise ratio (SINR) may suffer from inter-cell interference.

Figure 10:
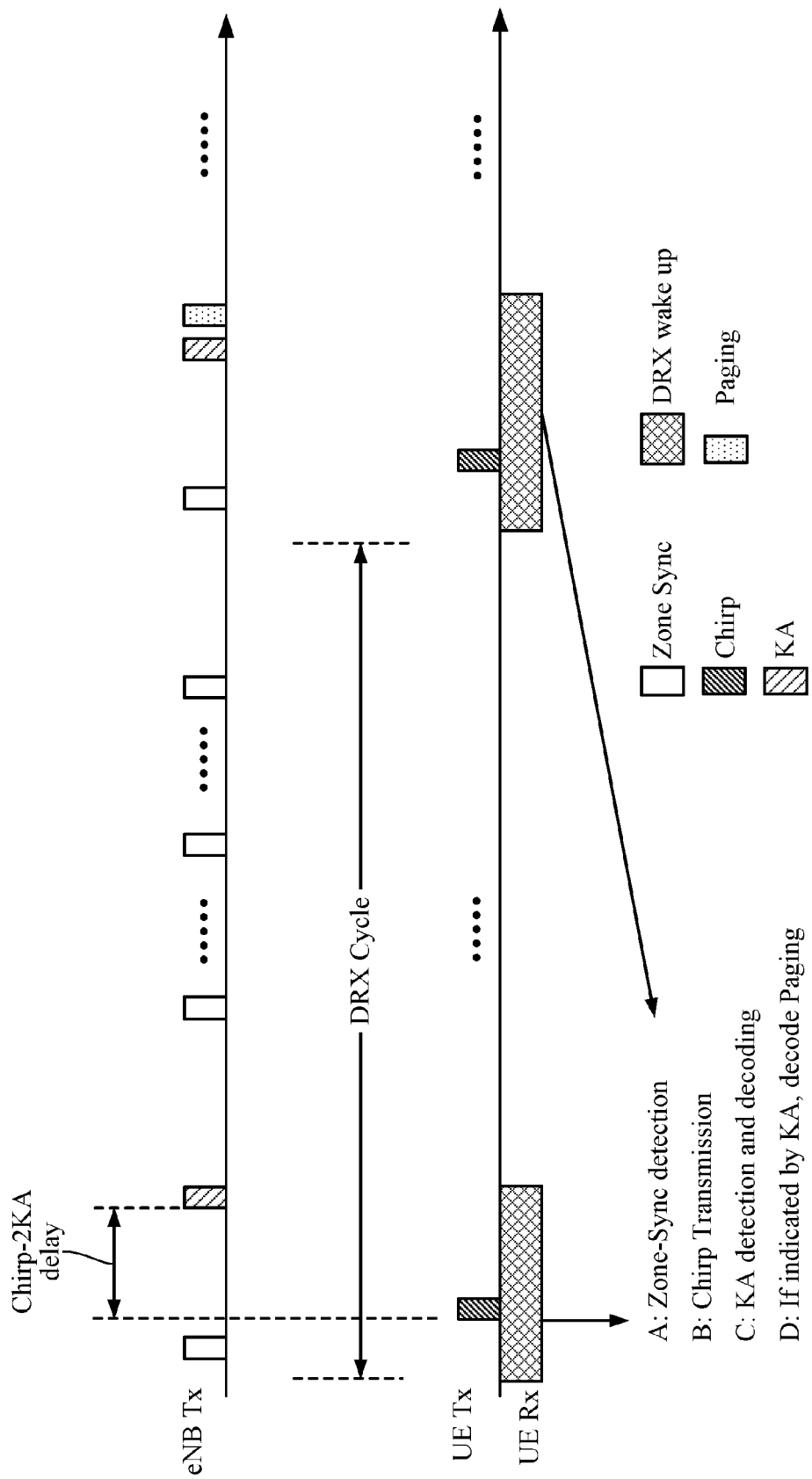
FIG. 10 is a transmission time illustrating an example uplink-based mobility scenario, in accordance with certain aspects of the present disclosure.

FIG. 10 is a transmission timeline that illustrates an uplink-based mobility scenario for a UE during DRX operation. In an uplink-based mobility scenario, a BS may make mobility decisions based on measurements of an uplink reference signal from a UE (e.g., without sending any MRS). As shown in FIG. 10, during a DRX wake up period, the UE may synchronize, for example, based on receiving the zone synchronization signal and the UE sends an uplink MRS (e.g., chirps), for example, a physical uplink mobility indicator channel (PUMICH). Examples of zone synchronization signals include, for example, a zone PSS, zone SSS, MRS-z, etc. The UE may use the zone synchronization signal to resynchronize to the zone and/or the UE may perform measurements on the zone synchronization signals. The UE may measure the zone synchronization signal in an effort to determine if the UE is located in the zone or if the UE has moved into another zone. As described above, a zone may refer to a group of BSs managed by an ANC (e.g., a zone may include the three TRPs 208 illustrated in FIG. 2, managed by the ANC 202).

According to one or more cases, the UE may monitor for a keep alive (KA) signal (e.g., the physical KA channel (PKACH)) from the network. The KA signal may indicate whether there is a paging message for the UE. In response to the uplink reference signal, the network (e.g., the ANC/CU) may perform cell search and select a cell to serve the UE (e.g., without the UE being aware of the selected cell). The network selects the BS for transmitting the KA signal and paging to the UE.

As described above, each UE in a zone may transmit a PUMICH signal to the BS for use in cell search and selection by the network. Generally, it is desirable for a zone to be able to support a large number of UEs and as such, PUMICH design should accommodate as many uplink based UEs per BS as possible. Additionally, in uplink based mobility designs, the BS should be able to identify the UE associated with a particular MRS, such that a BS receiving a PUMICH from a UE should be able to identify which UE transmitted the PUMICH in order to search for and select a cell to serve the UE and send KA signals to the UE.

One example of a PUMICH design capable of supporting a large number of UEs as well as identifying the UE includes a PUMICH design where the PUMICH includes multiple RACH pre/mid/post-ambles to allow multiple UEs to access the BS, followed by a data payload. This data payload may contain UE identification information, for example, the UE ID, or information that enables the BS to determine the UE ID. Such a PUMICH design may experience capacity limitations due to RACH sequence collisions, as well as due to the ability of a BS to decode multiple data payloads within a certain period of time.

Payload-Less PUMICH Design

Another example of a PUMICH design includes a PUMICH having multiple RACH sequences without a data payload. In PUMICH designs without a data payload, a UE may be identified based on the RACH sequences included in the PUMICH.

According to aspects of the present disclosure, a network may assign a unique and orthogonal RACH sequence to each UE in a zone as a PUMICH signature. Each PUMICH signature may be unique with respect to the specified RACH sequence, subframe timing, and frequency. For example, each uplink centric subframe may be capable of carrying up to four RACH sequence instances, for example, in a bandwidth of 5 MHz out of a possible 80 MHz system bandwidth. There may be 64 possible preambles for each RACH sequence instances for a total of 256 possible orthogonal PUMICH signatures for each uplink centric subframe. Additionally, assuming a 1.28 second DRX cycle with a subframe duration of 500 μs with 10% of the subframes designated as uplink centric subframes, there may be 256 subframes available for uplink transmissions, for a total capacity of 65,536 possible unique and orthogonal RACH sequences available for assignment for a zone. In this example, as all PUMICH signatures are orthogonal, per cell capacity would be the same as the total zone capacity, or 65,536.

However, zones may cover relatively large geographic areas, such as a town, and a zone capacity of 65,536 may be insufficient. This zone capacity may be increased through spatial reuse of the RACH sequences by reconfiguring a UE's PUMICH signature as the UE moves within a zone. However, where each UE has a unique and orthogonal PUMICH signature, there may be little protection against out-of-cell interference or interference from many UEs accessing a single BS, and spurious RACH sequences may be detected.

Figure 11:
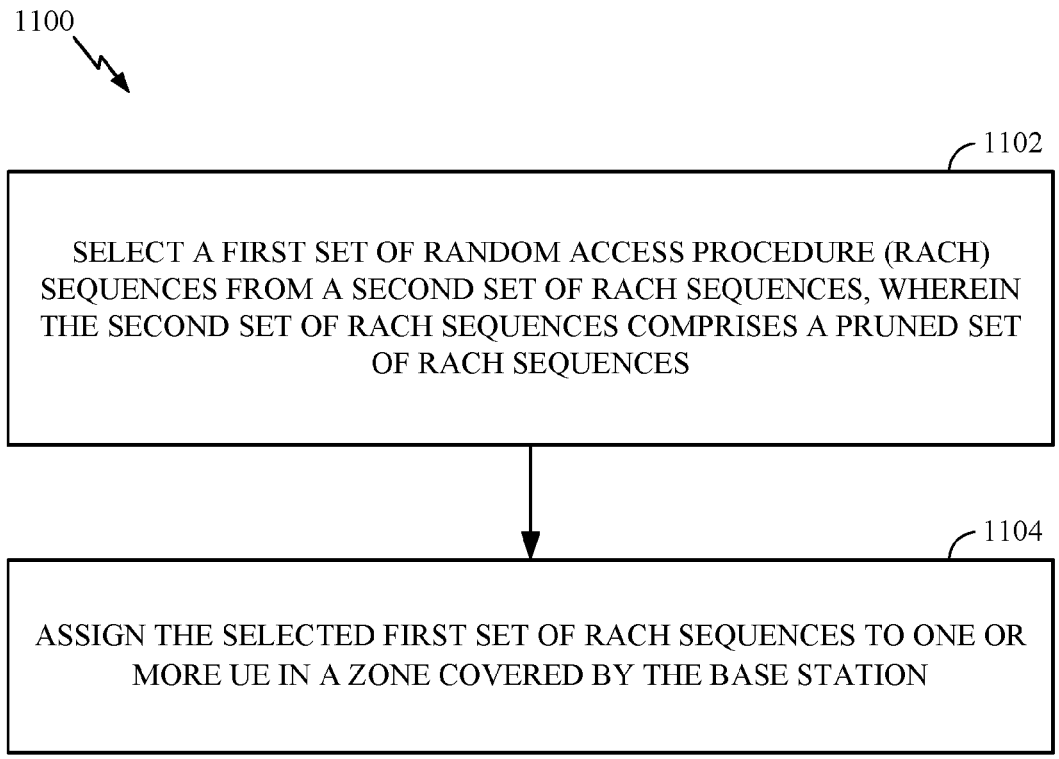
FIG. 11 is a flow diagram illustrating example operations that may be performed by a BS, in accordance with certain aspects of the present disclosure.

FIG. 11 is a flow diagram illustrating example operations 1100 that may be performed, for example, by a BS (e.g., 110a, 110b, and 110c), in accordance with certain aspects of the present disclosure. The operations 1100 may begin, at 1102 by selecting a first set of random access procedure (RACH) sequences from a second set of RACH sequences, wherein the second set of RACH sequences includes a pruned set of RACH sequences, and wherein at least some the first set of RACH sequences selected for a first user equipment (UE) is also available for selection for a second UE. At 1104, the operations 1100 may further include transmitting the selected first set of RACH sequence to a UE in response to a request from the UE.

Figure 12:
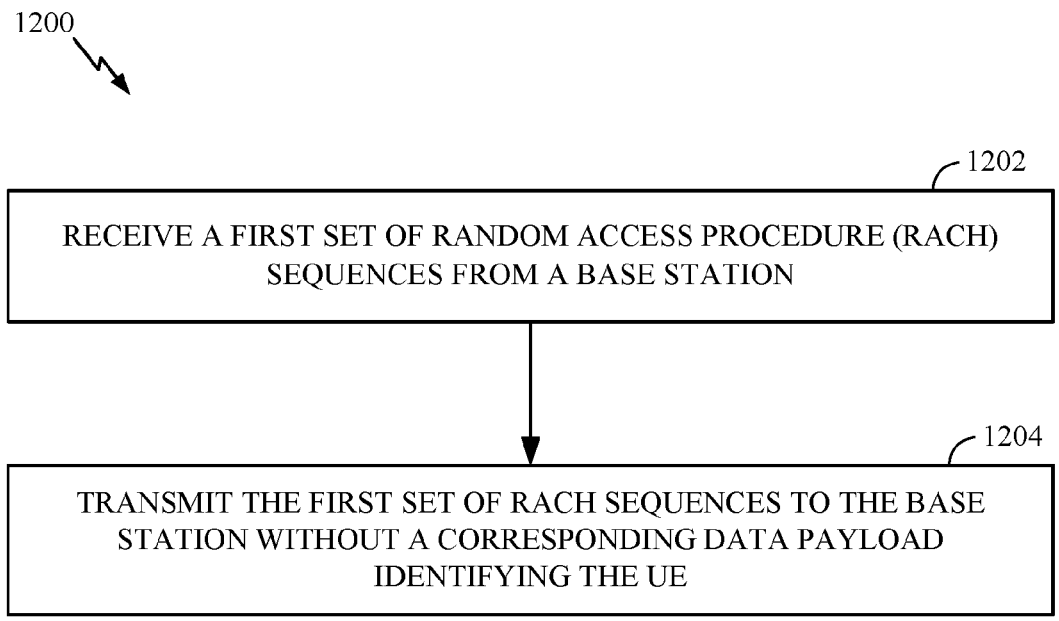
FIG. 12 is a flow diagram illustrating example operations that may be performed by a UE, in accordance with certain aspects of the present disclosure.

FIG. 12 is a flow diagram illustrating example operations 1200 that may be performed, for example, by a UE (e.g., UE 120), in accordance with certain aspects of the present disclosure. The operations 1200 may begin, at 1202 by receiving a first set of random access procedure (RACH) sequences from a base station. At 1204, the operations may further include transmitting the first set of RACH sequences to the base station without a corresponding data payload identifying the UE.

To help address issues with capacity and spurious signals, the orthogonality requirement may be relaxed and an amount of redundancy introduced. For example, a PUMICH signature for a UE may include a unique combination of RACH sequences transmitted in specific uplink centric subframes where the PUMICH signatures for the UEs need not be orthogonal and not all possible combinations of RACH sequences are assigned to the UEs of a zone. By relaxing the orthogonality constraint, the number of UEs a zone is capable of handling may be significantly increased. However, as more than one UE may be able to use the same PUMICH signature, it is possible for a BS to misidentify one UE from another, although the probability of misidentification is low as UEs assigned the same RACH sequences would be assigned using different PUMICH occasions or are located geographically far away.

Redundancy may also be used to help reduce the probability of misidentification and better identify and reject spurious RACH sequences. For example, a UE may be assigned a subframe timing along with a PUMICH signature, where each PUMICH signature includes four RACH sequences (e.g., a set of RACH sequences). Further redundancy may be achieved by algorithmically pruning the set of all possible RACH sequences such that not all possible RACH sequences are valid. Invalid RACH sequences are not assigned to UEs and if a BS receives a signal having RACH sequences that are invalid, the BS can reject the signal as spurious.

The set of valid RACH sequences may be selected using, for example, a binary block code. For example where the PUMICH has four RACH sequences where each RACH sequence has 64 possible sequences, there are approximately 16.7 million ($64^4$) total possible combinations. Each possible PUMICH combination can be uniquely identified in binary by 24 bits. A binary block code may be applied to these 24 bits to reduce the number of possible RACH sequences and select a set of valid RACH sequences.

Generally, a block code is a code in which k bits may be input into the code and n bits are output. A binary block code with, for example, parameters (n, k)=(24, 12) would allow for 4096 total possible valid RACH sequences to be assigned. As discussed above, for a 1.28 second DRX cycle, there may be 256 subframes available for uplink transmissions for a total number of possible unique PUMICH assignments to 256×4096, or approximately one million (1,048,576) possible unique PUMICH assignments and this number also represents the number of UE that can be supported by a zone (e.g., zone capacity). Additionally, by using a binary block code to select the set of valid RACH sequences, the set of valid RACH sequences may be tuned. For example, a larger k value may be specified to enhance zone capacity, trading off redundancy rate. Alternatively, a smaller k value allows for greater redundancy, enhancing the ability of the scheme to reduce the likelihood of UE confusion and rejecting spurious RACH sequences.

A BS may, after a request for a PUMICH from a UE, assign the UE a PUMICH including 4 RACH sequences selected from the set of valid RACH sequences, along with an identifier of an uplink centric subframe in which the UE may transmit the PUMICH.

The UE may, as a part of UE operations during a DRX wake-up under uplink base mobility, transmit its assigned PUMICH in the identified uplink centric subframe. The BS, after receiving the subframe, may associate the PUMICH with the UE and respond appropriately.

Where the BS receives multiple PUMICH transmissions, the BS may identify the UEs associated with the multiple PUMICHs by considering all possible combinations of the RACH sequences received as candidate RACH sequences and comparing these candidate RACH sequences against the set of valid RACH sequences to eliminate spurious or invalid RACH sequences. The UE PUMICH signatures associated with the remaining valid RACH sequences may be determined to be the UEs transmitting as a part of uplink based mobility.

As an example of receiving multiple PUMICH transmissions, a first UE may be assigned a RACH sequence of (a1, a2, a3, a4), while a second UE may be assigned a RACH sequence of (b1, b2, b3, b4), where both the first and second UEs transmit their PUMICH in the same uplink centric subframe. An uplink centric subframe may be capable of carrying up to four RACH sequence instances in four RACH occasions. In the first RACH occasion, the BS may receive {a1, b1}, {a2, b2} in the second RACH occasion, {a3, b3} in the third, and {a4, b4} in the fourth. The BS may then determine all possible combinations of the occasions, here in this case n^4 where n=the number of RACH preambles detected per RACH occasion. Here n=2, for a total of 16 candidate RACH sequences in the case. The BS then compares the candidate RACH sequences against the set of valid RACH sequences and rejects the invalid candidate RACH sequences. As there are, in this example, approximately 4000 valid combinations out of a possible one million combinations, the majority of the candidate RACH sequences should be rejected leaving valid candidate RACH sequences. These valid candidate RACH sequences may then be compared against the RACH sequences actually assigned to determine the associated UEs. Where the BS is not capable of resolving all UE, for example, due to some spurious RACH sequences, the BS may then repeat the process with a different order and accept the results with the larger number of UEs resolved.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1); a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a base station (BS), comprising:
   selecting a first set of random access procedure (RACH) signatures, each RACH signature comprising a combination of one or more RACH sequences, from a second set of RACH signatures, wherein the second set of RACH signatures comprises a pruned set of RACH signatures of a set of all possible RACH signatures, and wherein the pruned set of RACH signatures includes one or more non-orthogonal RACH signatures;
   assigning RACH signatures only from the selected first set of RACH signatures to one or more user equipments (UEs) in a zone covered by the base station, wherein each of the one or more UEs is assigned a single RACH signature;
   receiving at least one RACH signature of the first set of RACH signatures from at least one of the one or more UEs, wherein the at least one RACH signature is received without a corresponding data payload identifying the at least one UE; and
   identifying the at least one UE based on the at least one RACH signature and the pruned set of RACH signatures.

2. The method of claim 1, wherein different base stations have different first sets of RACH signatures to assign to one or more UEs in zones covered by the different base stations.

3. The method of claim 1, wherein the pruned set of RACH signatures is based on a binary block code filter applied to the set of all possible RACH signatures.

4. The method of claim 3, comprising adjusting the binary block code filter based on at least one of zone capacity or redundancy rate.

5. The method of claim 4, wherein the adjusting comprises adjusting a parameter of the binary block code filter.

6. The method of claim 1, further comprising transmitting a random access response to the identified at least one UE in response to receiving the at least one RACH signature.

7. The method of claim 1, wherein the receiving the at least one RACH signature comprises receiving each of the one or more RACH sequences of the at least one RACH signature during one or more RACH occasions.

8. The method of claim 7, wherein the identifying comprises further comprising:
determining all possible combinations of RACH sequences received over the one or more RACH sequences; and
determining whether the combinations of RACH sequences correspond to RACH signatures in the pruned set of RACH signatures.

9. The method of claim 8, wherein the identifying the at least one UE comprises:
rejecting the combinations of RACH sequences corresponding to RACH signatures that are not in the pruned set of RACH sequences; and
accepting the combinations of RACH sequences corresponding to RACH signatures that are in the pruned set of RACH sequences.

10. The method of claim 1, wherein the one or more non-orthogonal RACH signatures comprises RACH signatures having a combination of non-orthogonal RACH sequences.

11. An apparatus for wireless communications by a base station (BS), comprising:
means for selecting a first set of random access procedure (RACH) signatures, each RACH signature comprising a combination of one or more RACH sequences, from a second set of RACH signatures, wherein the second set of RACH signatures comprises a pruned set of RACH signatures of a set of all possible RACH signatures, and wherein the pruned set of RACH signatures includes one or more non-orthogonal RACH signatures;
means for assigning RACH signatures only from the selected first set of RACH signatures to one or more user equipments (UEs) in a zone covered by the base station, wherein each of the one or more UEs is assigned a single RACH signature;
means for receiving at least one RACH signature of the first set of RACH signatures from at least one of the one or more UEs, wherein the at least one RACH signature is received without a corresponding data payload identifying the at least one UE; and
means for identifying the at least one UE based on the at least one RACH signature and the pruned set of RACH signatures.

12. The apparatus of claim 11, wherein different base stations have different first sets of RACH signatures to assign to one or more UEs in zones covered by the different base stations.

13. The apparatus of claim 11, wherein the pruned set of RACH signatures is based on a binary block code filter applied to the set of all possible RACH signatures.

14. The apparatus of claim 11, further comprising means for transmitting a random access response to the identified first at least one UE in response to receiving the at least one RACH signature.

15. The apparatus of claim 11, wherein the means for receiving the at least one RACH signature comprises means for receiving each of the one or more RACH sequences of the at least one RACH signature during one or more RACH occasions.

16. The apparatus of claim 15, further comprising:
means for determining all possible combinations of RACH sequences received over the one or more RACH sequences; and
means for determining whether the combinations of RACH sequences correspond to RACH signatures in the pruned set of RACH signatures.

17. The apparatus of claim 11, wherein the one or more non-orthogonal RACH signatures comprises RACH signatures having a combination of non-orthogonal RACH sequences.

18. An apparatus for wireless communications, comprising:
a memory; and
at least one processor coupled with the memory and configured to:
select a first set of random access procedure (RACH) signatures, each RACH signature comprising a combination of one or more RACH sequences, from a second set of RACH signatures, wherein the second set of RACH signatures comprises a pruned set of RACH signatures of a set of all possible RACH signatures, and wherein the pruned set of RACH signatures includes one or more non-orthogonal RACH signatures;
assign RACH signatures only from the selected first set of RACH signatures to one or more user equipments (UEs) in a zone covered by a base station, wherein each of the one or more UEs is assigned a single RACH signature;
receiving at least one RACH signature of the first set of RACH signatures from at least one of the one or more UEs, wherein the at least one RACH signature is received without a corresponding data payload identifying the at least one UE; and
identify the at least one UE based on the at least one RACH signature and the pruned set of RACH signatures.

19. The apparatus of claim 18, wherein the one or more non-orthogonal RACH signatures comprises RACH signatures having a combination of non-orthogonal RACH sequences.

20. A computer readable medium storing computer executable code thereon, comprising:
code for selecting a first set of random access procedure (RACH) signatures, each RACH signature comprising a combination of one or more RACH sequences, from a second set of RACH signatures, wherein the second set of RACH signatures comprises a pruned set of RACH signatures of a set of all possible RACH signatures, and wherein the pruned set of RACH signatures includes one or more non-orthogonal RACH signatures;
code for assigning RACH signatures only from the selected first set of RACH signatures to one or more user equipments (UEs) in a zone covered by a base station, wherein each of the one or more UEs is assigned a single RACH signature;

code for receiving at least one RACH signature of the first set of RACH signatures from at least one of the one or more UEs, wherein the at least one RACH signature is received without a corresponding data payload identifying the at least one UE; and code for identifying the at least one UE based on the at least one RACH signature and the pruned set of RACH signatures.

21. The non-transitory computer readable medium of claim 20, wherein the one or more non-orthogonal RACH signatures comprises RACH signatures having a combination of non-orthogonal RACH sequences.

* * * * *